United States Patent Office 2,972,520
Patented Feb. 21, 1961

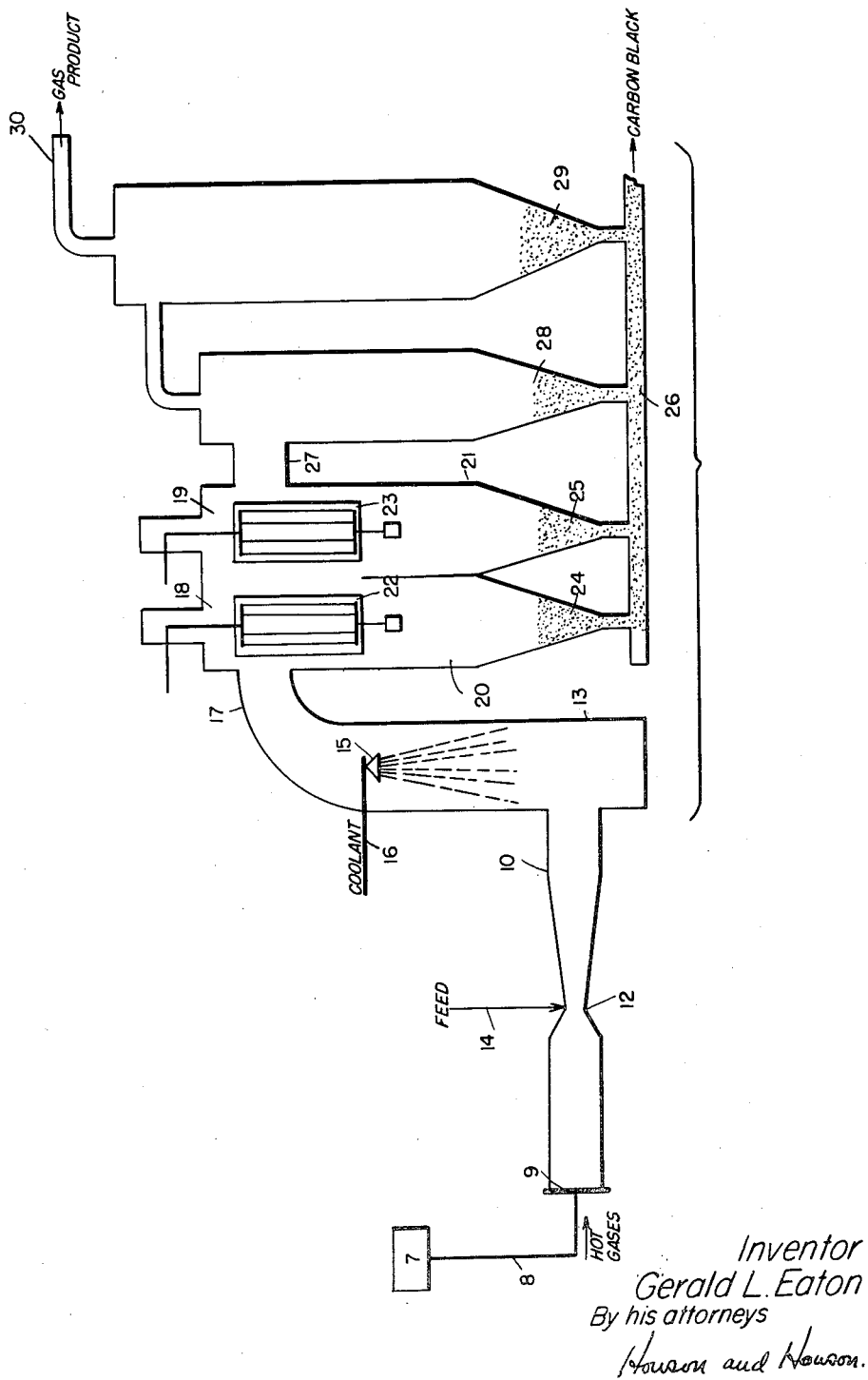

2,972,520
PYROLYSIS OF WASTE SULFITE LIQUOR

Gerald L. Eaton, Philadelphia, Pa., assignor to United Engineers & Constructors Inc., Philadelphia, Pa., a corporation of Delaware Filed Sept. 6, 1957, Ser. No. 682,499

8 Claims. (Cl. 23—209.4)

This invention relates to a process for the pyrolysis of ammonia-base waste sulfite liquors and solid material derived therefrom and in particular to a process for the pyrolysis of ammonia-base waste sulfite liquors in which recovery of a maximum amount of carbon black is made possible.

In the production of cellulose pulp by the ammonia-base sulfite process, wood chips are digested with ammonium sulfite. During digestion a liquor is produced which contains about 50% of the weight of the original wood and substantial quantities of sulphur and ammonia. While the exact form in which the ammonia and sulphur exist is not fully known, they are believed to be present, at least in large part, as the salts of lignin sulphonic acids, and sugars. A possible skeletal structure [*] of these lignin sulphonic acids is

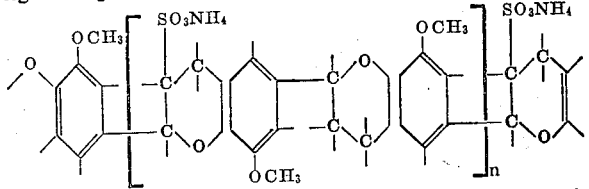

The economic disposal of these materials has presented a considerable problem. They cannot be dumped into streams or waterways because they will, in many instances, cause objectional pollution. They can be dried and burned, but the heat recovery from such processes is seldom if ever sufficient to pay for the cost of building, maintaining and operating the necessary equipment.

It is an object of the present invention to provide a method for treating waste sulfite material which will be more economical than existing processes.

It is another object of the present invention to provide a method for treating waste sulfite material by means of which a valuable salable product can be made.

It is a further object of the invention to provide a process by means of which carbon black can be made economically from waste sulfite material.

In accordance with the invention these and other objects are attained by mixing the ammonia-base waste sulfite liquor with a moving stream of high velocity gases having a temperature between about 2500° F. and about 4000° F. and thereby atomizing, heating, vaporizing, and pyrolyzing said liquor and forming a combined stream having a temperature between about 2000° F. and about 3000° F. and recovering carbon black from said stream. By a high velocity gas stream is meant one having a velocity sufficiently high to maintain the sulfite suspended in the stream in a turbulent dispersed phase and substantially uniformly distributed across the cross-section of the stream. Such velocity will be at least 200 feet per second and is usually between about 200 and about 700 feet per second. Under these conditions a sufficient amount of heat can be transferred both uniformly and rapidly to the sulfite material so as to achieve nearly instantaneous vaporization and uniform decomposition and pyrolysis of the sulfite material into carbon black.

Carbon black is a form of nearly pure carbon characterized in that it consists of essentially spherical, quasi-graphitic particles of colloidal dimensions. Most carbon black is made by burning a light hydrocarbon such as natural gas with a deficiency of oxygen and collecting the liberated carbon on a metal surface by actual contact of the flame on the surface. In other commercial processes heavier hydrocarbons, such as oils are incompletely burned in a furnace at say 2000-3000° F. under conditions giving rise to the formation of carbon black.

In the manufacture of carbon black from relatively heavy hydrocarbonaceous materials it is necessary to vaporize all the vaporizable components of the hydrocarbon in a very short time, i.e. on the order of 0.01 second. If this is not done the product will be char, coke, or some other less desirable form of carbon, rather than carbon black. Once this initial vaporization has been accomplished the subsequent pyrolysis of the hydrocarbons may be carried out over as long a reaction time as may be desired or necessary.

By mixing hydrocarbonaceous waste sulfite material with a high velocity gas at a high temperature in accordance with the invention, it is possible to substantially instantaneously vaporize the hydrocarbonaceous portion of the material. Subsequent cracking of the vaporized material at the temperature specified for the combined stream thus forms carbon black rather than char, coke or other forms of carbon.

The hot gas with which the waste material is mixed may be any gaseous material. High temperature products of combustion such as hot flue gases from a gas or oil burner may be used either alone or in admixture with steam. A slightly oxidizing atmosphere is desirable to suppress formation of hydrogen sulfide.

As noted above, the hot gases will be at a temperature of between about 2500° F. and about 4000° F., preferably between about 3000° F. and 3800° F. From about 1 and about 25 parts by weight of gas per part of waste sulfite feed will be used, the exact proportion depending on the temperature and heat capacity of the gas and on the temperature and solids content of the feed. When oxygen is present in the hot gas, it will generally be in the proportion of between about 0.01 and about 0.5 part by weight, per part of waste sulfite feed.

The pressure under which the present process is conducted is not a critical factor and may vary within wide limits. Normally, the hot gases entering the pyrolysis system are at a pressure of between about 2 p.s.i.g. and about 300 p.s.i.g.

As intimated above the composition of the feed may vary somewhat in the solids content, which may be anywhere from about 2% to 75% by weight. The advantages obtained from the process are most marked, however, when the feed is a liquid containing say about 40% to 75% solids.

In carrying out the invention, the waste sulfite material is normally injected into the swiftly flowing stream of hot gases. Preferably the hot gases are made to flow through a conduit or elongated passageway having a Venturi throat or equivalent constriction and the waste sulfite material is injected into the hot gas stream at the constriction. The gases are then usually cooled to say 300° F.–1500° F. either by direct quenching with an aqueous liquid or by indirect heat exchange, as for example in a waste heat boiler. The cooled stream may then be sent to any of the conventional carbon black separation system well known to the industry.

[*] Markham et al., Paper Trade Journal, 127, No. 1, TAPPI Section, p. 299.

Although it is normally preferred to cool the hot combined stream before carbon black is separated therefrom, because of the fact that less expensive separation equipment may be employed, it is possible to separate the carbon black from the gases before cooling or quenching.

The invention will be further described with reference to the drawing which is a schematic flow diagram of a preferred system for the pyrolysis of waste sulfite liquor according to the invention.

Referring to the figure, a preferred system for carrying out the invention comprises a pyrolysis conduit 10 which empties into a separation and recovery apparatus indicated generally as 11. The conduit 10 has an inlet 9 for hot gases and a Venturi constriction 12. A line 8 is provided for carrying hot gases from a source 7 which may be a boiler, or a furnace or other combustion device, to the inlet 9. A line 14 is provided for introducing feed material into the conduit 10 at the constriction 12.

The separation and recovery apparatus 11 is that conventionally used for recovering carbon black from a stream of hot gases and comprises a spray tower 13 having a downwardly facing spray device 15 to which coolant is supplied through a line 16. A duct 17 is provided for bringing material emanating from the top of spray tower 13 to a set of electrostatic precipitators 18, 19. The construction of such precipitators is well known. Basically they comprise chambers 20, 21 having suspended therein a series of wire electrodes 22, 23. Hopper shaped portions 24, 25 at the bottom of the chamber are provided for collecting precipitated solids. The hopper portions each empty into a conveyor 26 by means of which the solids are collected.

A duct 27 is provided for conveying material from precipitator 19 to a system of cyclone separators 28, 29 arranged in series. The cyclones also empty into conveyor 26.

In operation, a high temperature gas such as steam, flue gas, or a combination of the two is delivered from source 7 through a line 8 to the inlet 9 of conduit 10. Preferably, as indicated above, this gas contains some oxygen. It is at a temperature between about 2500° F. and about 4000° F. and at a pressure of between about 2 and about 300 p.s.i.g. Moving down the conduit it enters the constriction 12. Here a stream of the waste sulfite material to be pyrolyzed is introduced through the line 14. The velocity of the hot gas in the constriction is between about 200 and about 700 feet per second and the impact of this high velocity gas atomizes, vaporizes and pyrolyzes the waste material. The extremely high resultant temperature of the combined stream, say about 2000° F. to 3000° F., preferably about 2200° F. to 2600° F. decomposes the lignin sulfonic acid and sugars and liberates sulfur dioxide; and at the same time vaporizes and pyrolyzes the carbonaceous portions of the ligneous material. After a total contact time above about 0.01 second, and normally on the order of between about 0.1 and about 0.5 second, the combined stream of hot gas and pyrolyzed waste material is delivered into the spray tower 13 where it is met with an aqueous spray delivered through spray device 15. By this means it is cooled to say 300° F. to 1500° F.

The cooled material is then moved through duct 17 into precipitators 18 and 19 where a certain proportion of the carbon black solids are removed. The remainder is delivered with entraining gases to the cyclones 28 and 29 where substantially all the carbon black remaining in the gases is removed. The carbon black separated in precipitators 18 and 19 and in the cyclones 28, 29 is collected as a single stream by conveyor 26, and may be sent to further processing equipment (not shown) for packaging, with or without prior pelletizing.

The gaseous material comprising fixed gases, $SO_2$ and some hydrocarbons is removed through duct 30 where it may be treated for the recovery of one or more of these materials as desired.

The invention will be further described by means of the following illustrative specific example.

*Example*

Using the system shown in the drawing, 340,000 pounds per hour of flue gas containing about 3% by weight $O_2$ at 3600° F. and 10 p.s.i.g. are introduced into conduit 10 at inlet 9. 113,000 pounds per hour of an ammonia base waste sulfite liquor containing 50% solids are introduced through line 14. The solid component of this material has a proximate analysis (percent by weight dry basis) as follows:

| | |
|---|---|
| Volatile matter | 65 |
| Ash | 1 |
| Fixed carbon | 34 |
| | 100 |

After leaving the Venturi constriction, the combined stream has a temperature of about 2400° F. In the spray tower 13 it is met with 174,000 pounds per hour of water having a temperature of about 160° F. The temperature of the stream is thereby reduced to 800° F. This quenched stream is then passed into the recovery and separation apparatus and carbon black is separated from the gaseous components of the stream.

The pyrolysis products may be described as follows:

| | Lbs./hr. |
|---|---|
| Fixed gases (from pyrolysis) | 24,900 |
| Sulfur dioxide | 7,600 |
| Carbon black | 19,000 |
| Water (from pyrolysis) | 5,000 |
| Total from pyrolysis of waste ammonia-base sulfite liquor solids | 56,500 |

Many variations are possible within the scope of the invention and will readily occur to those skilled in the art. In particular, in place of the spray tower shown in the figure, the quenching system described in my copending application Pyrolysis of Ammonia Base Waste Sulfite Liquor, Serial No. 682,500, filed September 6, 1957, may be used.

What is claimed is:

1. A method for the treatment of ammonia base waste sulfite material to recover carbon black therefrom which comprises mixing said material, containing between about 2 and about 75% by weight solids, with a high velocity stream of gases having a temperature between about 2500° F. and about 4000° F. to vaporize the vaporizable components of said material within a time on the order of 0.01 second, to pyrolyze said material with the production of carbon black and to form a combined stream of hot gases and pyrolyzed material having a temperature between about 2000° F. and about 3000° F., and subsequently recovering carbon black from said combined stream.

2. The method claimed in claim 1 in which the combined stream is quenched.

3. The method claimed in claim 1 wherein the temperature of the combined stream is between about 2200° F. and about 2500° F.

4. The process claimed in claim 1 wherein the high velocity gases have a velocity between about 200 and about 700 ft./sec.

5. A process for the treatment of ammonia base waste sulfite material to produce carbon black therefrom which comprises mixing said material, containing between about 2 and about 75% solids, with a high velocity stream of gases having a velocity between about 200 and about 700 ft./sec. and a temperature between about 2500° F. and about 4000° F. to vaporize the vaporizable components of said material in a time on the order of 0.01 second, to pyrolyze said material with the production of carbon black and to form a combined stream of gases and vaporized material, the weight proportion of high velocity gas to waste material being between about 1 and about 25 and being such that the temperature of the combined stream is between about 2000° F. and about 3000° F., and recovering carbon black from said combined stream.

6. The process claimed in claim 5 wherein the hot gases contain between about 0.01 and about 0.5 part by weight of oxygen, per part of waste sulfite material.

7. The process claimed in claim 5 and comprising quenching the combined stream.

8. The process claimed in claim 6 wherein the solids content of the feed is between about 40% and about 75% by weight.

References Cited in the file of this patent

UNITED STATES PATENTS

| | | |
|---|---|---|
| 1,462,752 | Jacobs | July 24, 1923 |
| 2,617,714 | Arnold | Nov. 11, 1952 |
| 2,739,039 | Phelps | Mar. 20, 1956 |

FOREIGN PATENTS

| | | |
|---|---|---|
| 699,470 | Great Britain | Nov. 11, 1953 |
| 525,031 | Canada | May 15, 1956 |